United States Patent [19]
Williams et al.

[11] Patent Number: 5,642,202
[45] Date of Patent: Jun. 24, 1997

[54] SCAN IMAGE TARGET LOCATOR SYSTEM FOR CALIBRATING A PRINTING SYSTEM

[75] Inventors: Leon C. Williams, Walworth; Jeng-nan Shiau, Webster, both of N.Y.

[73] Assignee: Xerox Corporation, Stamford, Conn.

[21] Appl. No.: 347,756

[22] Filed: Dec. 1, 1994

[51] Int. Cl.$^6$ ................................................ H04N 1/401
[52] U.S. Cl. ........................ 358/406; 358/296; 382/312
[58] Field of Search .............................. 382/312, 319;
355/208, 52; 358/296, 298, 406, 448, 504,
474, 505, 530; 399/15

[56] References Cited

U.S. PATENT DOCUMENTS

| | | | |
|---|---|---|---|
| 5,198,907 | 3/1993 | Walker et al. | 358/296 |
| 5,287,162 | 2/1994 | De Jong et al. | 355/208 |
| 5,452,112 | 9/1995 | Wan et al. | 358/504 |
| 5,510,896 | 4/1996 | Wafler | 358/296 |

*Primary Examiner*—Peter S. Wong
*Assistant Examiner*—Derek J. Jardieu
*Attorney, Agent, or Firm*—Michael J. Nickerson

[57] ABSTRACT

A system and method for calibrating a printing system includes a printer and a master test image document printed by the printer. The master test image has three locator symbols and a plurality of test objects, each symbol having a distinct apex. The apexes are non-colinear. A memory prestores image data corresponding to the test objects printed on the master test image document and positional data corresponding to a desired coordinate value for each non-colinear apex. The system also includes a scanner for scanning the master test image document and detects the locator symbols printed on master test image document to generate transition data therefrom. The calibration process determines a coordinate value for each non-colinear apex based on the transition data and generates a transformation matrix based on a difference between the determined coordinate value for each non-colinear apex and the desired coordinate value for each non-colinear apex. A compensation process retrieves prestored image data corresponding to the scanned image data based on the transformation matrix. The calibration process then compares scanned image data with the retrieved prestored image data to generate compensation values based on a difference between the scanned image data and the prestored image data.

17 Claims, 4 Drawing Sheets

SCAN IMAGE TARGET LOCATOR SYSTEM FOR CALIBRATING A PRINTING SYSTEM

FIELD OF THE PRESENT INVENTION

The present invention is directed to a method and system of calibrating a scanner. More specifically, the present invention is directed to a system and method for providing an accurate positional determination of test objects to be utilized in a calibration sequence or other diagnostic or testing applications.

BACKGROUND OF THE PRESENT INVENTION

In many areas of copier/printer/scanner image quality testing, it is desirable to start with a known test or master, process it through the machine under test, and analyze the resulting image. Based on the results of this analysis, the machine under test, can be adjusted, calibrated, or compensated via various control points. For example, if a halftone pattern is being reproduced on a laser printer, the resulting reflectance of the electronically generated halftone can change from printer to printer or overtime for the same printer. If the output from a printer is digitized via a scanner, the printer's response to an applied halftone can be measured and compensated for by modifying parameters within the halftoning process such as the tonal reproduction curve. Thus, by applying a known input, and measuring the error between the desired output and the actual output, a matrix of correction terms can be derived to obtain the desired output from the machine.

FIG. 1 illustrates a conventional system used to calibrate a monochrome printer. A scanner 1 scans in a master or target image having a predetermined set of test patches. This master image is stored in a master image memory 10. When calibrating the printer, the stored master image is fed to a printer 9 via a compensating circuit 7 which allows the master image to pass therethrough without processing. The printer 9 prints the master image on a recording medium which is fed back into the scanner 1. The scanned in image is fed to an analyzer 3 which compares the image data values of the scanned in image with the master image data values fed from the master image memory 10. The analyzer 3 determines the errors or differences between the two images and produces calibration values therefrom which are stored as a new screen matix in a calibration values memory 5. The calibration values are used by compensating circuit 7 to correct image data subsequently sent to the printer 9 so that the image is reproduced accurately.

The calibration technique described with respect to FIG. 1 can also be extended to calibrate color printers. However, due to the increase number of output attributes, calibration in the color domain is more complex. In addition, the calibration technique can be extended to line width/growth image quality diagnostics, photorecpetor deletions, etc.

First, the color scanner itself needs to be properly calibrated since most scanners are not colorimetric. The conventional scanner calibration is done by scanning a color test pattern with the scanner. The scanner R, G, B readings are then correlated with the CIE/XYZ values of the patches measured with a colorimeter. Grey patches in the test pattern can be used to establish the relationship between the scanner R, G, and B values and the luminance intensity L. The L equivalent scanned R, G, and B values are then multiplied by a 3×3 matrix to yield the X, Y, and Z values. The matrix of correction coefficients are determined by regression analysis to minimize the difference between the measured and calculated X, Y, and Z values. With the scanner calibrated, the device dependent scanner R, G, and B values can then be related to the device independent standard measures, such as the CIE/XYZ values.

Once the scanner is calibrated, the printer is calibrated. There are several methods of performing color printer output calibrations, such calibrations can be classified as algorithmic, table look-up, or a hybrid approach.

In calibrating the color printer, conventionally, a printed test image is scanned by a calibrated scanner. A resulting 24 bit image in LAB space (30 bits in RGB space) is then analyzed (ten bits per RGB color scan), and the average scan patch RGB values are determined and converted to device independent data. The device independent data can then be processed to convert the data into L*C*h* space. Interpolated RGB levels corresponding to a minimum chroma can then be the basis of a set of grey balance screens or a set of new seed RGB values for a new test pattern generation, if further iteration is required.

The second step in the conventional color calibration is to determine the color correction matrix or matrices that will enable a match between the input and output colors. Initially, color seed data is utilized to print multiple 3×9 matrices of color patches. The colors in each matrix correspond to all the possible combinations of increasing and decreasing RGB values by a fixed amount around a center value targeted towards a selected set of colors. The pattern is then printed on the color printer to be calibrated.

The printed patterns are then scanned with the scanner RGB values of the patches being converted to the CIE/ L*a*b* and the color difference between the printed patches and the corresponding test target are computed. The RGB values of the patch with the minimum color difference are then used as color seed data in the next iteration. Upon obtaining a set of modified RGB values that have a small enough color difference, a multiple linear regression analysis is performed to determine the matrix needed to transform the input RGB to the modified RGB. One way of conventionally transforming the input to the modified RGB is utilizing a process which weights each term by the sum of the squares of partial differentials of L*, a*, and b* with respect to R, G, and B values evaluated at the target RGB points. Once the transformation is established between the input RGB to the modified RGB, these values can be utilized to calibrate the color printer.

As discussed above, advances in digital image processing make it possible to scan, digitize, and analyze xerographic prints for image quality defects for printing/scanning calibration purposes. However, one of the difficulties in performing this task automatically is the lack of a fast, accurate method for locating the coordinates and scale of the scanned image relative to the original paper document. In other words, conventional calibration systems have a problem establishing a proper positional relationship between the scanned in image and the target or master image which was utilized to generate the original target document.

More specifically, if the printing of a color or monochrome patch is slightly skewed or offset from its original target or master position or the scanned in color or monochrome test patch is skewed or offset from its actual printed position, the positional deviation will cause problems in the calibration system. It is not always possible to scan the page from the printer so that the position of the pixel (Xp, Yp) of the master image exactly corresponds to the position of the pixel (Xs, Ys) of the scanned image. Thus, a system which determines a coordinate transformation between a master image and a scanned image can counteract the problems associated with offset, scale, and rotation.

For example, if a test patch is offset by 20 pixels from its original targeted position, the calibration analysis, expecting a color, monochrome, or grey patch in a certain 20 pixel wide region, will produce a false calibration by recording an error in this area since no patch was detected because the expected patch was not printed within the certain 20 pixel wide region due to the 20 pixel offset. Any calibration values resulting from this false calibration do not reflect the actual master test print and the scanned data since the error was due to positional deviation.

To overcome this problem in a calibration system, a target locater system is utilized to inform the scanner of the actual position of the printed test patches so that the image data read by the scanner can be properly transformed positionally to enable comparison with the correct reference data.

Conventionally, transformation systems have used location systems that depend on cross-hairs or arrows which are difficult to find in a digitized image. Once found, the analysis for these locators typically can only use a few pixels to determine a specified point. This limits the accuracy and noise immunity of the desired point.

The present invention proposes to overcome these problems with a target location system that relies on a greater number of points and is accurate and immune to noise.

OBJECT AND SUMMARY OF THE PRESENT INVENTION

One aspect of the present invention is a system for calibrating a printing system. The system includes a printer and a master test image document printed by the printer. The master test image has three locator symbols and a plurality of test objects, each symbol having a distinct apex. The apexes are non-colinear. The system also includes scanning means for scanning the master test image document and symbol means for detecting the locator symbols printed on master test image document and for generating transition data therefrom. Coordinate means determines a coordinate value for each non-colinear apex based on the transition data, and memory means prestores image data corresponding to the test objects printed on the master test image document and positional data corresponding to a desired coordinate value for each non-colinear apex. Transformation means generates a transformation matrix based on a difference between the determined coordinate value for each non-colinear apex and the desired coordinate value for each non-colinear apex, and position compensation means retrieves prestored image data corresponding to the scanned image data based on the transformation matrix. The system further includes calibration means for comparing scanned image data with the retrieved prestored image data and for generating compensation values based on a difference between the scanned image data and the prestored image data.

Another aspect of the present invention is a method for calibrating a printing system. The method prints a master test image document by a printer to be tested. The master test image has three locator symbols and a plurality of test objects. Each symbol has a distinct apex, and the apexes are non-colinear. Image data corresponding to the test objects printed on the master test image document and positional data corresponding to a desired coordinate value for each non-colinear apex is prestored. The method also scans the master test image document and detects the locator symbols printed on the master test image document to generate transition data therefrom. A coordinate value is determined for each non-colinear apex based on the transition data. Furthermore, a transformation matrix based on a difference between the determined coordinate value for each non-colinear apex and the desired coordinate value for each non-colinear apex is generated, and a prestored image data corresponding to the scanned image image data based on the transformation matrix is retrieved. The scanned image data is compared with the retrieved prestored image data to generate compensation values based on a difference between the scanned image data and the prestored image data.

A third aspect of the present invention is a test document. The test document includes three locator symbols, each symbol having a distinct apex. The apexes are non-colinear. The test document also includes a plurality of test objects.

Further objects and advantages of the present invention will become apparent from the following descriptions of the various embodiments and characteristic features of the present invention.

BRIEF DESCRIPTION OF THE DRAWINGS

The following is a brief description of each drawing used to describe the present invention, and thus, are being presented for illustrative purposes only and should not be limitative of the scope of the present invention, wherein.

DETAILED DESCRIPTION OF THE DRAWINGS

Figure 1:
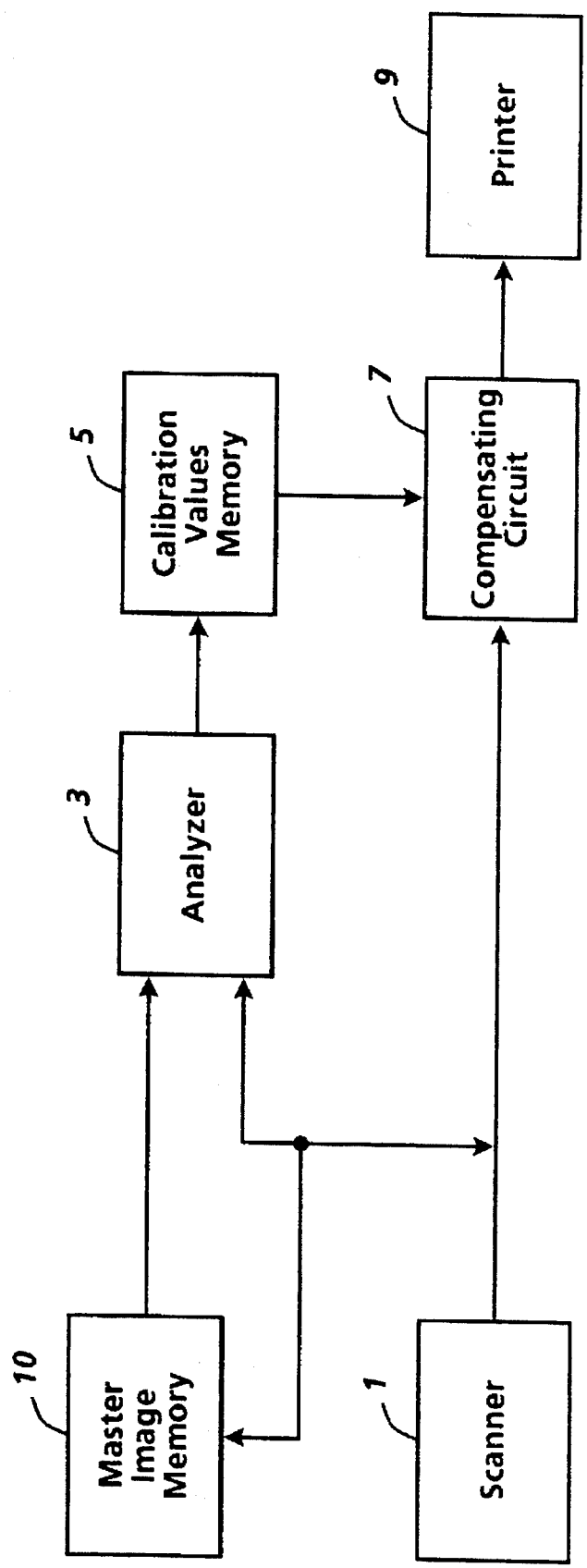
FIG. 1 shows a block diagram illustrating a conventional calibration system.

The following will be a detailed description of the drawings illustrating the present invention. In this description, as well as in the drawings, like reference numerals represent like devices, circuits, or equivalent circuits performing the same or equivalent functions.

Figure 2:
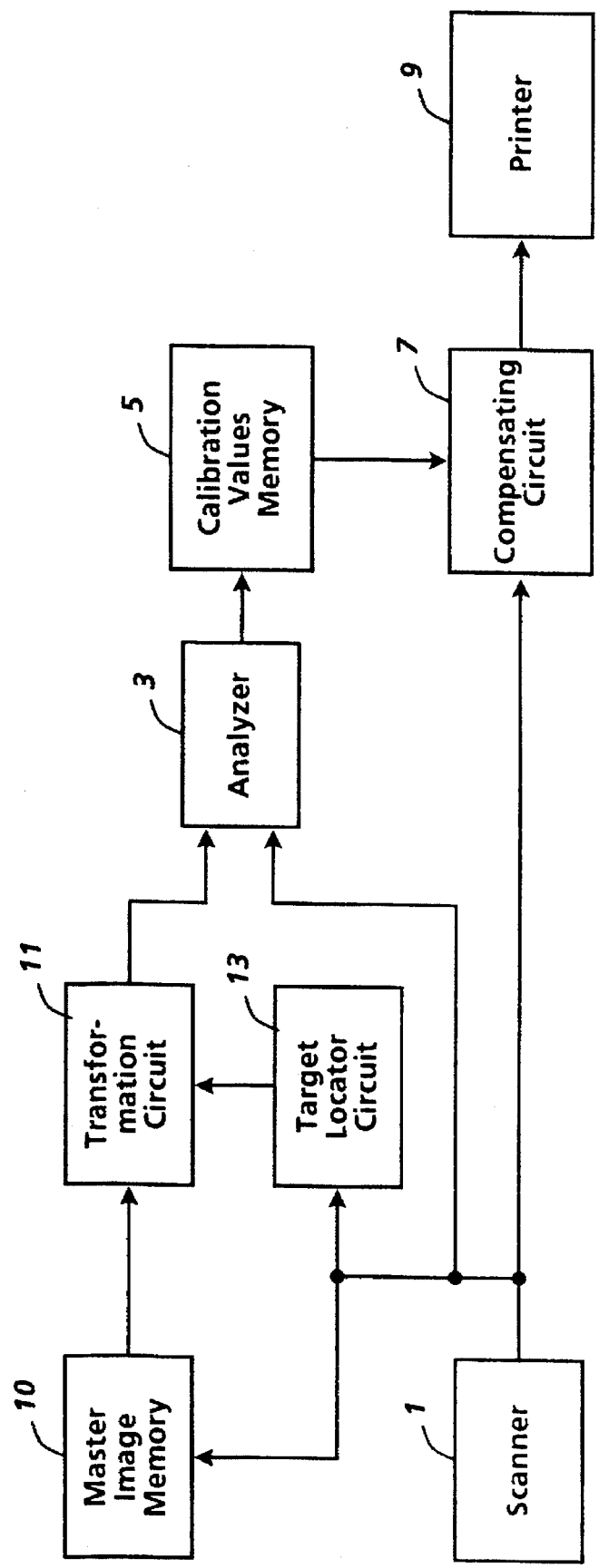
FIG. 2 shows a block diagram illustrating a calibration system utilizing the target locator system of the present invention.
Figure 3:
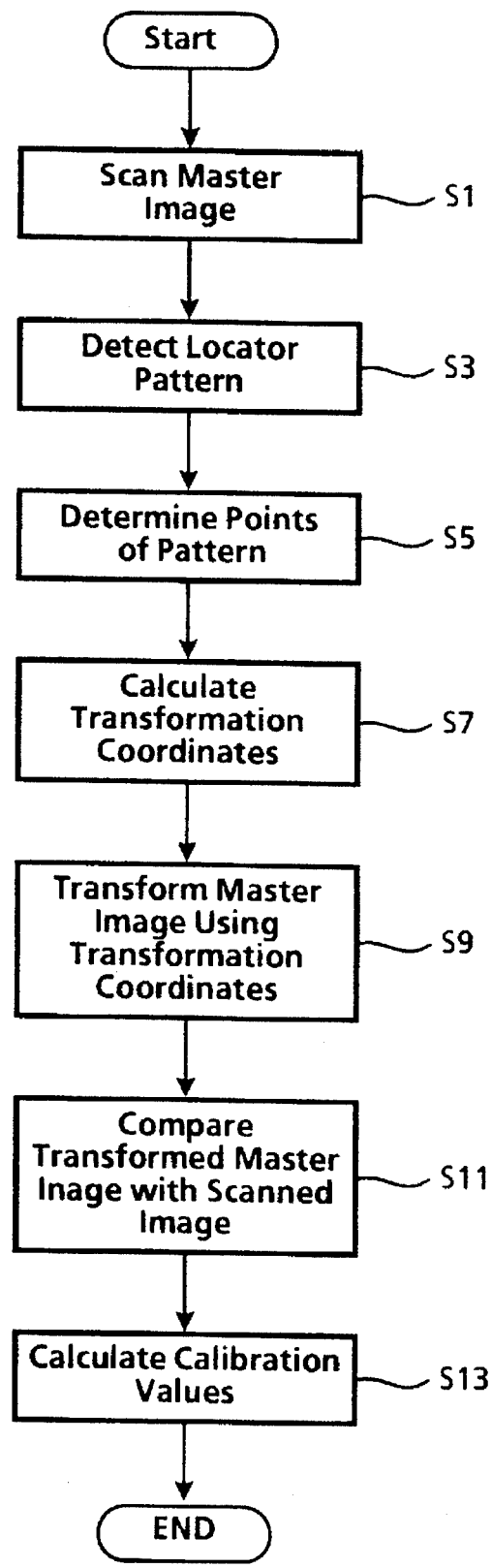
FIG. 3 shows a flowchart illustrating the calibration process of the present invention.

FIG. 2 illustrates a system which integrates a calibration process with the target locator system of the present invention. As in FIG. 1, scanner 1 of FIG. 2 scans in a master or target image. In the preferred embodiment of the present invention, the master image includes target locator symbols; however, these symbols may be added electronically to the master image when the master image is transferred to a printer 9 for printing on a recording medium. The master or target image has a predetermined set of test patches or objects. The scanned master image is stored in a master image memory 10.

When calibrating the printer, the stored master image is fed to a printer 9 via a compensating circuit 7 which allows the master image to pass therethrough without processing. If the target locator symbols are not part of the stored master image, the compensating circuit 7 can add these symbols to the master image before it is sent to the printer 9.

The printer 9 prints the master image with the target locator symbols on a recording medium which is fed back into the scanner 1. The scanned image is fed to a target locator circuit 13 which looks for scanlines having six transitions (white to black or black to white) to detect the presence (boundaries) of the target locator symbols on that particular scanline. More specifically, the target locator circuit 13 detects the target locator symbols as graphically illustrated in FIGS. 5 and 6.

The transition points can be calculated or detected a number of ways. For example, the transition points can be calculated or detected using a simple threshold routine such that when the grey level of the video signal rises above a certain threshold value, a transistion has been encountered. On the other hand, the transition can be calculated or detected by finding the maximum of the deriative of the grey level of the video signal.

One such method would be a circuit having an accumulator in the form of an arthmetic logic unit (ALU) wherein one input of the ALU would receive the feedback of the output value and the other input would receive either the value of the current pixel, the value of a first pixel ($P_0$) in a scanline having N pixels, the value of a center pixel ($P_{(N/2)-1}$) in the scanline, or the value of a last pixel ($P_{N-1}$) in the scanline through a multiplexer. The ALU produces a value $Acc_i$ which is equal to $Acc_{i-1} - P_{N-1} + 2P_{(N/2)-1} + P_0$. This value is then fed to an absolute value circuit to porduce the value $|Acc_i|$. The absolute value is fed into a comparator or decision circuit to determine if the absolute value $|Acc_i|$ is greater than a threshold value. If the value is greater than or equal to the threshold, a peak or transistion is detected. If the value is less than the threshold, a peak or transistion is not detected.

Alternatively, a maximum peak circuit can be added to the above circuit. More specifically, if the absolute value is greater than or equal to the threshold, it is determined by another comparator or decision circuit if the absolute value $|Acc_i|$ is greater than the absolute value $|Acc_{i-1}|$. If the absolute value $|Acc_i|$ is greater than the absolute value $|Acc_{i-1}|$, a maximum peak is established at the pixel $P_i$. If the absolute value $|Acc_i|$ is not greater than the absolute value $|Acc_{i-1}|$, it is determined if the peak is at the pixel $P_{i-1}$. If the peak is at the pixel $P_{i-1}$, the peak is established at pixel $P_{i-1}$, otherwise the pixel is established at pixel $P_i$.

After a predetermined number of scanlines having the target locator symbols (having only six transitions) have been scanned, in the preferred embodiment the predetermined number is six scanlines, the target locator circuit determines the equation of the six lines going through the various transition points. For example, the target locator circuit calculates: the equation of a first line passing through all the first transition points; the equation of a second line passing through all the second transition points; the equation of a third line passing through all the third transition points; the equation of a fourth line passing through all the fourth transition points; the equation of a fifth line passing through all the fifth transition points; and the equation of a sixth line passing through all the sixth transition points. These lines represent edges of the target locator symbols.

The lines associated with each symbol are then solved to produce three points. More specifically, the first and second lines are solved for the first target locator symbol, the third and fourth lines are solved for the second target locator symbol, and the fifth and sixth lines are solved for the third target locator symbol. The three points are fed to a transformation circuit 11 which creates transformation coordinates for the calibration process.

The scanned master image is also fed to an analyzer 3 which compares the image data values of the scanned image with positionally compensated master image data values fed from the master image memory 10. The master image data is positionally compensated by the transformation circuit 19 which positionally adjusts the master image data so that the master image data can be compared with positionally corresponding scanned data. In other words, the master data is positionally transformed to eliminate the effects of offset, scaling or rotation in the scanned image. It is noted that the scanned image data could be positionally transformed in lieu of the master image data without affecting the results, the only change being how the transformation coordinates are applied to the data; i.e., if the transformation coordinates are added to the master image data, the coordinates would be subtracted from the scanned image data.

The analyzer 3 determines the errors or differences between the two positionally associated images and produces calibration values therefrom which are stored as a screen matrix or matrices in a calibration values memory 5. The calibration values are used by compensating circuit 7 to correct image data subsequently sent to the printer 9 so that the image is reproduced accurately. The utilization of these specific targets and subsequent location analysis enables accuracy, magnification tolerance, and noise immunity in the calibration process.

The calibration process utilized by the present invention may be any conventional calibration process. For example, in a digital reprographic system that reproduces either continuous tone or half-tone pictorials, a digital screen or digital screening method is utilized to convert the monochrome multi-level image into a monochrome bi-level image targeted for a specific printer. Digital screens can be specified by two independent functions; a dot growth pattern and a threshold level array. The dot growth pattern defines a shape of each halftone dot and how that dot will be filled. The total number of positions within each dot determines the maximum number of the unique grey levels which can be reproduced (N+1). Typically, a digital reprographic system will have many dot growth patterns, error diffusion, and spot overlap tables which are optimized for different types of pictorials.

The threshold level array, of size N, defines the bi-level decision values for each position in the dot growth pattern. By substituting a threshold level array element into the dot growth pattern having the same index, an unique screen matrix is formed. Thus, by adjusting the values of the threshold level array, brightness, contrast, and detail of the pictorial reproduced on the printer can be changed independent of the dot growth pattern. Due to this independence, the values for the threshold level array, which on a target printer result in a linear change in reflectance, can be quantized to N+1 levels.

Given a specific dot growth pattern, a calibration print can be generated which contains patches. Each patch is an area filled with multiple, adjacent copies of the dot pattern at a specific stage in the growth sequence. Since N+1 grey levels can be represented using a dot growth pattern of size N, N+1 patches are generated on a calibration print; one for each possible grey level. Once printed, each patch exhibits a reflectance value which can be measured. Thus, the set of N+1 patches represent all the possible reflectance values which can be printed on the target printer for a specific dot growth pattern.

By setting each element in the threshold level array to the measured reflectance of the corresponding patch, a screen matrix, which is linear in reflectance, can be obtained for a specific printer and dot growth pattern. Thus, the process to generate linear reflectance screens for a given dot growth pattern and printer can be summarized as the generating of a bi-level calibration print with patches for each stage of the dot growth sequence; printing the calibration print on the target printer; measuring the reflectance of each patch on the calibration print; setting the value of each element of the threshold level array to the corresponding patch reflectance; and building a new screen matrix from the original dot growth pattern and the new threshold level array.

Utilizing the calibration process and the target locator system described above, a semiautomatic procedure can be utilized to calibrate digital reprographic systems. Since it is typical for an image scanner to be used in the capture of pictorials, it is possible to use the same scanner for the patch reflectance measurement step described above. This is accomplished by scanning the calibration print from the target printer and numerically averaging the patch areas to determine the resulting reflectance of each patch. Moreover, the test patches may be wheels to provide more calibration information per test sheet. For example, a color wheel will allow calibration of hue and saturation at a specific luminance. On the hand, the wheel may be for grey balance calibration wherein offset from neutral and intensity can be calibrated.

The linear transformation system of the present invention will be described in more detail below.

As noted above, the linear transformation system of the present invention can determine the coordinate transformation between a master image and a scanned image. To utilize this linear transformation system, the location of three points must be known on both the master and the scanned image to develop the transformation matrix. To define the three points, a set of targets are added to the master image (either electronically or on paper) which can be identified by analysis after the printed master test image has been scanned.

In the preferred embodiment of the present invention, a system of three triangles are utilized to develop the transformation matrix. More specifically, in the preferred embodiment of the present invention, the three triangles are applied to every master test image which needs to be scanned. These triangles are arranged as shown in FIG. 4.

Figure 4:
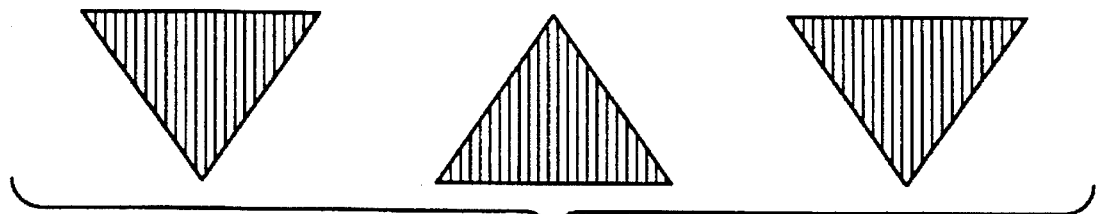
FIG. 4 shows one example of location targets used to calculate transformation coordinates.

Although FIG. 4 illustrates the triangles as being a non-solid image, in the actual embodiment of the present invention, these three triangles are solid black images. The triangles could not be illustrated as solid due to the requirements imposed by the Official Draftsman of the United States Patent Office. Thus, for illustrative purposes only, the triangles are illustrated with vertical lines within the boundaries of the images.

Figure 5:
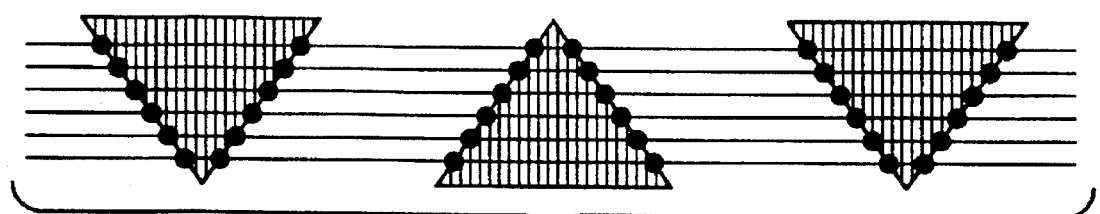
FIG. 5 shows a graphical generation of points based on detection of the edges of the location targets along a scan-line.
Figure 6:
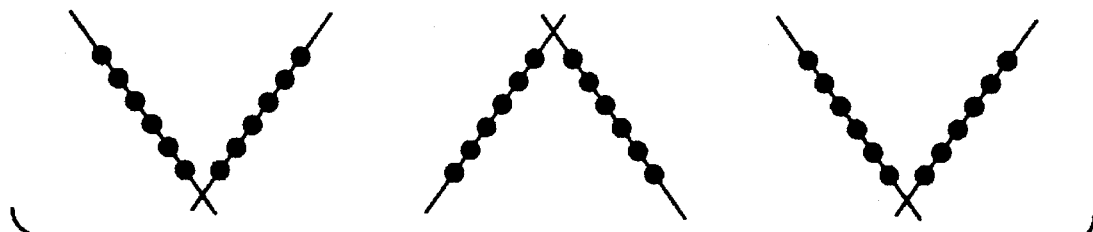
FIG. 6 shows a graphical generation of lines through the points of FIG. 5.

After applying the three triangles to every master test image which is to be scanned, the master test image is scanned in by the scanner. In scanning the master test image, the present invention detects the edge transitions of these triangles (black to white or white to black) on each successive scanline as illustrated in FIG. 5. The detected edge transitions are depicted as solid dots along the scanlines (horizontal lines). Over multiple scanlines, the location of these edge points (in the scanned image coordinate system) can be analyzed using linear regression to determine the equation of the line that passes through these dots. The developed lines represent either the left or right boundary of each triangle. This is illustrated in FIG. 6.

Figure 7:
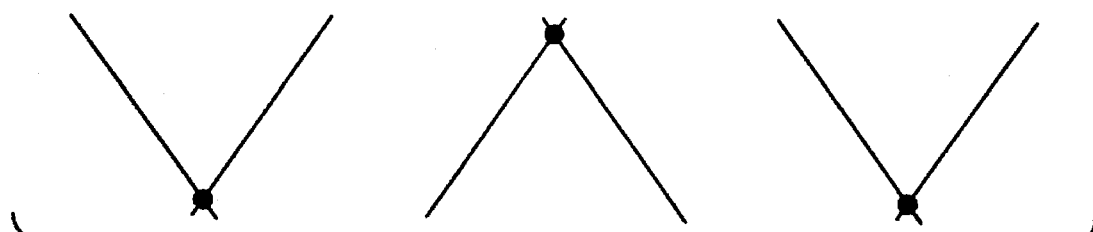
FIG. 7 shows a graphical calculation of three apexes from lines in FIG. 6 used in calculating the transformation coordinates.

Once the equations of these lines are determined, the resulting left and right side equations of each triangle are solved to determine the point of intersection for the lines as illustrated in FIG. 7. The intersections, algebraically, represent the apex of each triangle of the scanned image.

These three points are then used to determine the linear coordinate transformation from the master image to the scanned image. More specifically, the points are compared with the target location of these points according to the master image information to produce a positional difference. The positional difference is integrated into the calibration process to ensure that image data for a master pixel is compared with the scanned image data of the correct pixel. In other words, the resulting coordinate transformation enables any point/pixel/region of the master image to be quickly identified with its corresponding point/pixel/region of the scanned image.

In the preferred embodiment of the present invention, the triangles are about one inch tall yielding between 300 to 600 possible scanlines, depending on the resolution, that will yield six transitions for analysis. The size can be adjusted for maximun tolerance to skew problems. Since so much data is available, heuristic "sanity checks" can be made on the incoming transition points to ensure that the data being analyzed is accurate.

For example, since the targets symbols of the preferred embodiment of the present invention are located in a known area which will not include any other marks, it can be expected that a proper scanlines to be utilized in the analysis will contain exactly six transitions. If this is not the case, the data for that scanline is simply discarded. Moreover, if the six transitions are not reasonably spaced across the line, the data again can be discarded. This enables the target locator system of the present invention to be immune to dust and scratches which have plagued previous locator systems.

In the preferred embodiment of the present invention, the target locators are placed at the top of the image. This placing of the locators at the top of the image enables the calibration analysis procedure to start at the beginning of the image immediately after the locators are found. Since the sanity checks discard scanlines which do not contain exactly six transitions which are reasonably spaced, blank areas at the top of the image have no effect on the calibration technique.

The target locator system of the present invention also does not suffer from image sampling resolution inaccuracies. For example, when conventional systems look for the crossing of two lines, the result is, at best, equal to the sampling resolution. The linear aggression approach averages over many points, thereby yielding an accuracy which can be higher than the image sampling resolution of the scanner.

In another embodiment of the present invention, a bar code or other type of machine-readable encoded data can be placed on the master image to uniquely identify each test image. This encoded data can contain information, such as time, date, machine serial number, master image name, master image serial number, etc., which can be used by the analysis program. In a color environment, a barcode could be a sticker on the calibration target which contains information about the target. This enables lower cost calibration patterns since the calibration patterns need not be held to tight tolerances, rather the calibration patterns themselves could be calibrated and the results encoded in the barcode pattern.

In above described embodiment, once a valid scanline line with six transitions is found, transition data is gathered line by line until a predetermined number of scanlines have been processed with valid transition data. This triggers the linear regression analysis which produces the master/scan image coordinate transformation.

Based on this transformation, the location of the encoded information is known and properly read. At this point, only the top portion of the master has been read, the portion with the locators and data. The remainder of the image can be filled with test patterns to measure the desired imaging parameters. Upon reading the bar coded information, the analysis program can adapt the type of analysis to that required by the master image. In the preferred embodiment of the present invention, the encoded identity data is placed just below the target locators (symbols).

It is noted that all the operations described above can be performed without storing the bit map of the scanned image. More specifically, during the process in which transitions are being acquired, each valid scanline will generate six transitions. To accumulate data for linear regression, only five variables per line (for six lines, a total of 30 variables) need to be maintained. All processing can be performed in real time or on the fly during the scanning operation. This capability enables the locator system to be embedded in the scanner for real time operation and relatively low cost.

Another application of the present invention is the reproduction of halftones on laser printers because the threshold levels which make up the halftone cell must be carefully chosen. Since machines will have different transfer characteristics or even the same machine over time will have a different transfer characteristic, the designed tone reproduction curve for a given printer may vary. The calibration of this curve is essential for consistent quality image reproduction.

The calibration process is started by generating a master page with target locator symbols followed by encoded data. Following this control information, a series of halftone patches are printed. Each of these patches contain a uniform halftone area representing the halftone cell at a particular dot growth stage. By printing patches at all possible halftone dot growth stages, the printer under test can be calibrated for the densities which it can reproduce with that dot growth pattern. The calibration print with the locator symbols and patches can now be scanned. This process is also applicable to a color process wherein the test patches would be color patches.

Other examples of the application of the present invention will be described below.

In a manufacturing environment, high quality master targets with the target locator symbols of the present invention may be scanned to evaluate image quality of the scanner. Registration offset, scaling, skew, and MTF can be measured and compensated either via mechanical or electronic image processing operations. Since each high quality test target can include encoded identification data and associated known characteristics, the absolute precision of the master target can be relaxed in favor of precision measurement of each target. This can reduce manufacturing costs by reduced operator intervention or reduced mechanical tolerances.

Technical support or end users can periodically place one or several test targets with the target locator symbols of the present invention on a scanner and request that the scanner fine tune the adjustments made during manufacturing automatically. This reduces the end users cost of ownership by lower service cost and higher quality or both. This also enables the printing characteristics such as line growth, solid area reproduction, halftone density, etc. to be measured and compensated.

With respect to electronic copiers, an electronic master may be printed with the target locator symbols of the present invention and scanned to measure complete input to output image quality performance and perform corrections to maintain copy quality. The master print can be transferred from printer to scanner either manually or automatically via a special paper path. If existing remote interactive communication technology is utilized, image quality defects and the required service procedure can be reported and a schedule for service can be setup even before the customer is aware of the problem. In color copiers, calibration, color correction, and color stability are significant factors. By enabling the automatic calibration of the scanner/printer, service calls for color copiers can be significantly reduced.

In another embodiment of the present invention, the test patches could be glyph encoded to inform the scanning system of other desired characteristics of the patch.

Although the present invention has been described in detail above, various modifications can be implemented without departing from the spirit of the present invention. For example, the preferred embodiment of the present invention has been described with respect to triangles as being the target locator symbols; however, the target locator symbols may be any symbol or shape that enables the solving for three sets of intersecting lines to produce the three non-colinear points for the transformation calculation. For example, pentagons may be used.

Moreover, the present invention has been described as having target locator symbols of relatively the same size and with one of the symbols pointing in an opposite direction; however, the symbols need not be the same size or be pointing in an opposition direction. The symbols need only be situated so that the solved points of intersection are non-colinear.

Also, the present invention has been described as having solid black target locator symbols; however, the symbols need not be black or completely solid. The symbols may be any shade of grey or color so long as the scanner can detect the transition from background to target locator symbol. If the symbols are not completely solid, the lines outlining the symbols need to be thick enough to enable proper detection by the scanner and the detection process must be modified to compensate for the inclusion of additional transitions that will appear in a valid scanline.

Furthermore, the present invention has been described with test patches; however, the calibration sheet may contain any test object, such as grey patches, color patches, color wheels, grey balance wheels, line growth patterns, dot growth patterns, sweeps for grey balance, etc. The present invention is not limited merely test patches, but is applicable to any printed object which assists in the calibration, diagnosis, or testing of a printer.

Lastly, the present invention has been described with respect to a monochrome or black/white environment. However, the concepts of the present invention are readily applicable to a color environment.

In recapitulation, the present invention provides a target locator system which when utilized in a calibration process enables the calibration process to be accurate and immune from offset, scaling, rotation, and noise.

While the present invention has been described with reference to various embodiments disclosed herein before, it is not to be combined to the detail set forth above, but is intended to cover such modifications or changes as made within the scope of the attached claims.

What is claimed is:

1. A system for calibrating a printing system, comprising:
a printer;
a master test image document printed by said printer, said master test image having three locator symbols and a plurality of test objects, each symbol having a distinct apex, the apexes being non-colinear;
scanning means for scanning said master test image document;
symbol means for detecting the locator symbols printed on said master test image document and for generating transition data therefrom;
coordinate means for determining a coordinate value for each non-colinear apex based on the transition data;
memory means for prestoring image data corresponding to the test objects printed on said master test image document and positional data corresponding to a desired coordinate value for each non-colinear apex;
transformation means for generating a transformation matrix based on a difference between the determined coordinate value for each non-colinear apex and the desired coordinate value for each non-colinear apex;
position compensation means for retrieving prestored image data corresponding to the scanned image data based on the transformation matrix; and
calibration means for comparing scanned image data with the retrieved prestored image data and for generating compensation values based on a difference between the scanned image data and the prestored image data.

2. The system as claimed in claim 1, wherein said position compensation means changes a coordinate value of the scanned image data based on the transformation matrix.

3. The system as claimed in claim 1, wherein said position compensation means changes a coordinate value of the prestored image data based on the transformation matrix.

4. The system as claimed in claim 1, wherein said symbol means detects the locator symbols when it is determined that a scanline contains a predetermined number of transitions between symbol image data and background image data.

5. The system as claimed in claim 1, wherein said symbol means detects the locator symbols when it is determined that a scanline contains six transitions between symbol image data and background image data.

6. The system as claimed in claim 4, wherein said symbol means generates transition data for each scanline having the predetermined number of transitions between symbol image data and background image data, the generated transition data being coordinate values representing points of transition along the scanline between symbol image data and background image data.

7. The system as claimed in claim 5, wherein said symbol means generates transition data for each scanline having six transitions between symbol image data and background image data, the generated transition data being coordinate values representing the six points of transition along the scanline between symbol image data and background image data.

8. The system as claimed in claim 6, wherein said symbol means forms a plurality of sets of coordinate values, each set having coordinate values which correspond to an edge of a locator symbol.

9. The system as claimed in claim 7, wherein said symbol means forms six sets of coordinate values, each set having coordinate values which correspond to an edge of a locator symbol.

10. The system as claimed in claim 8, wherein said coordinate means comprises:
line means for calculating an equation for each set of coordinate values, each equation corresponding to a line that passes through the coordinate values within a set; and
intersection means for determining a point of intersection for each locator symbol, each point of intersection being created by the intersection of two lines which represent two edges of a locator symbol, the point of intersection representing the apex of the locator symbol.

11. The system as claimed in claim 9, wherein said coordinate means comprises:
line means for calculating six equations, each equation corresponding to a line that passes through the coordinate values within a set; and
intersection means for determining three points of intersection, each point of intersection being created by the intersection of two lines which represent two edges of a locator symbol, the point of intersection representing the apex of the locator symbol.

12. A method for calibrating a printing system, comprising the steps of:
(a) printing a master test image document on a printer to be tested, the master test image having three locator symbols and a plurality of test objects, each symbol having a distinct apex, the apexes being non-colinear;
(b) scanning the master test image document;
(c) detecting the locator symbols printed on the master test image document and generating transition data therefrom;
(d) determining a coordinate value for each non-colinear apex based on the transition data;
(e) prestoring image data corresponding to the test objects printed on the master test image document and positional data corresponding to a desired coordinate value for each non-colinear apex;
(f) generating a transformation matrix based on a difference between the determined coordinate value for each non-colinear apex and the desired coordinate value for each non-colinear apex;
(g) retrieving a prestored image data corresponding to the scanned image image data based on the transformation matrix; and
(h) comparing scanned image data with the retrieved prestored image data and generating compensation values based on a difference between the scanned image data and the prestored image data.

13. The method as claimed in claim 12, wherein said step (g) changes a coordinate value of the scanned image data based on the transformation matrix.

14. The method as claimed in claim 12, wherein said step (g) changes a coordinate value of the prestored image data based on the transformation matrix.

15. The method as claimed in claim 12, wherein said step (c) detects the locator symbols when it is determined that a scanline contains six transitions between symbol image data and background image data and generates transition data for each scanline having six transitions between symbol image data and background image data, the generated transition data being coordinate values representing the six points of transition along the scanline between symbol image data and background image data.

16. The method as claimed in claim 15, wherein said step (c) forms a plurality of sets of coordinate values, each set having coordinate values which correspond to an edge of a locator symbol.

17. The method as claimed in claim 16, wherein said step (d) comprises the substeps of:

(d1) calculating an equation for each set of coordinate values, each equation corresponding to a line that passes through the coordinate values within a set; and (d2) determining a point of intersection for each locator symbol, each point of intersection being created by the intersection of two lines which represent two edges of a locator symbol, the point of intersection representing the apex of the locator symbol.

* * * * *